(12) United States Patent
Bacic

(10) Patent No.: US 11,300,059 B2
(45) Date of Patent: Apr. 12, 2022

(54) SHAFT RESONANCE CONTROL

(71) Applicant: ROLLS-ROYCE plc, London (GB)

(72) Inventor: Marko Bacic, Derby (GB)

(73) Assignee: ROLLS-ROYCE plc, London (GB)

( * ) Notice: Subject to any disclaimer, the term of this patent is extended or adjusted under 35 U.S.C. 154(b) by 76 days.

(21) Appl. No.: 16/598,342

(22) Filed: Oct. 10, 2019

(65) Prior Publication Data

US 2020/0149480 A1 May 14, 2020

(30) Foreign Application Priority Data

Nov. 9, 2018 (GB) ..................... 1818268

(51) Int. Cl.
*F02C 9/28* (2006.01)
*F02C 9/48* (2006.01)

(52) U.S. Cl.
CPC .................. *F02C 9/28* (2013.01); *F02C 9/48* (2013.01); *F05D 2270/304* (2013.01)

(58) Field of Classification Search
None
See application file for complete search history.

(56) References Cited

U.S. PATENT DOCUMENTS

| | | | | |
|---|---|---|---|---|
| 5,349,811 A * | 9/1994 | Stickler | ...................... | F02C 9/28 60/39.281 |
| 8,321,104 B2 | 11/2012 | Mahmood | | |
| 2007/0245746 A1 | 10/2007 | Mollmann et al. | | |
| 2008/0276620 A1 * | 11/2008 | Ullyott | .................... | F01D 21/06 60/773 |
| 2009/0177433 A1 * | 7/2009 | Palmer | .................. | F01D 21/003 702/145 |
| 2014/0007584 A1 | 1/2014 | Hong et al. | | |
| 2014/0103884 A1 * | 4/2014 | Ficklscherer | .......... | B64D 35/02 322/19 |
| 2015/0035501 A1 | 2/2015 | Rozman et al. | | |
| 2016/0348533 A1 | 12/2016 | Ficklscherer | | |

FOREIGN PATENT DOCUMENTS

| | | |
|---|---|---|
| EP | 0601608 A1 | 6/1994 |
| EP | 2 020 744 A2 | 2/2009 |
| EP | 2 325 999 A2 | 5/2011 |
| EP | 2 662 561 A1 | 11/2013 |
| WO | 2014/209542 A1 | 12/2014 |

OTHER PUBLICATIONS

May 10, 2019 Combined Search and Examination Report issued in British Patent Application No. 1818268.3.
Mar. 16, 2020 Search Report issued in European Patent Application No. 19202179.

* cited by examiner

*Primary Examiner* — Katheryn A Malatek
(74) *Attorney, Agent, or Firm* — Oliff PLC

(57) ABSTRACT

A method of actively controlling torsional resonance of a rotating shaft of an engine is provided. The shaft has a rotational velocity characterised by a low frequency, rotational velocity term and a high frequency, oscillatory term superimposed on the low frequency term, the oscillatory term being caused by torsional resonance. The method including: measuring the rotational velocity of the shaft; extracting the oscillatory term from the measured rotational velocity; and on the basis of the extracted oscillatory term, applying a torque component to the shaft, the torque component being modulated at the same frequency as the torsional resonance to counteract the torsional resonance.

7 Claims, 4 Drawing Sheets

SHAFT RESONANCE CONTROL

The present disclosure relates to a method and system for actively controlling torsional resonance of a rotating shaft of an engine.

All gas turbine engines contain one or more shafts, with typical civil aerospace designs having two or three shafts. Each shaft connects the compressor to a driving turbine, and has a number of resonant frequencies. A consideration in the design of any gas turbine is that there should be no control structure interactions that could jeopardise the engine integrity. For example, control system must not excite shaft resonances, as this could lead to shaft failure. Similarly, other systems, or engine design features that may cause fluctuation of compressor or turbine torques that excite the resonance should be avoided.

A difficulty with avoid-by-design rules is that there can be unforeseen interactions which occur and cause forcing at a shaft resonance frequency. If these are large enough, or if the damping of the spool system is low enough, resonance amplitudes may be generated which are significant enough to limit shaft life, or in the extreme case lead to a shaft break. In particular, low pressure and/or intermediate pressure spools may be relatively lightly damped on some engines, and this can be a problem in terms of response of the shaft to random perturbations that contain a shaft resonance frequency.

The present disclosure is at least partly based on a realisation that active damping of a shaft can be used to address resonances caused by such unforeseen interactions.

According to a first aspect there is provided a method of actively controlling torsional resonance of a rotating shaft of an engine, the shaft having a rotational velocity characterised by a low frequency, rotational velocity term and a high frequency, oscillatory term superimposed on the low frequency term, the oscillatory term being caused by torsional resonance, the method including:
  measuring the rotational velocity of the shaft;
  extracting the oscillatory term from the measured rotational velocity; and
  on the basis of the extracted oscillatory term, applying a torque component to the shaft, the torque component being modulated at the same frequency as the torsional resonance to counteract the torsional resonance.

Advantageously, such active damping of the shaft can reduce or eliminate torsional resonances, thereby reducing the need to design-out resonance-inducing interactions.

Optional features of the method of the present disclosure will now be set out. These are applicable singly or in any combination.

The low frequency, rotational velocity term is typically consistent with the dominant time constant of the engine, and may be up to about 1 Hz for a large turbofan engine. The high frequency, oscillatory term, by contrast, may typically have a frequency in the range of from 10 Hz to 1 kHz (e.g. about 10-20 Hz for a low pressure shaft, about 25-750 Hz for an intermediate pressure shaft, and about 100-1000 Hz for a high pressure shaft).

The applied torque component may counteract the torsional resonance to substantially cancel the resonance.

The engine may be a gas turbine engine, for example an aero or marine engine. The shaft may be any shaft of such an engine, but particularly a low or intermediate pressure shaft as these tend to be relatively lightly damped shafts of the engine.

The measurement of the rotational velocity should be performed at a frequency which is higher than the torsional resonance frequency of the shaft. For example, it can be performed at at least twice the torsional resonance frequency of the shaft, and preferably at at least ten times the torsional resonance frequency of the shaft.

The extraction of the oscillatory term from the measured rotational velocity can include demodulating the measured rotational velocity.

Conveniently, the counteracting torque component may be applied to the shaft by modulating a flow rate of fuel to the engine. For example, the engine may have an engine fuel control system which generates a fuel flow demand signal for the engine in response to an acceleration demand signal and a steady state fuel flow requirement. The modulation of the flow rate of fuel to the engine can then be performed by frequency modulating the fuel flow demand signal.

However, another option is for the counteracting torque component to be applied to the shaft by an electric motor, such as a starter motor or generator.

The method can be performed simultaneously for plural shafts of the engine.

According to a second aspect there is provided a system for reducing torsional resonance of a rotating shaft of an engine, the shaft having a rotational velocity characterised by a low frequency, rotational velocity term and a high frequency, oscillatory term superimposed on the low frequency term, the oscillatory term being caused by torsional resonance, the system including:
  a device for measuring the rotational velocity of the shaft; and
  a control unit for: extracting the oscillatory term from the measured rotational velocity;
  and, on the basis of the extracted oscillatory term, issuing a command to apply a torque component to the shaft, the torque component being modulated at the same frequency as the torsional resonance to counteract the torsional resonance.

Optional features of the system of the present disclosure will now be set out. These are applicable singly or in any combination.

The applied torque component may counteract the torsional resonance to substantially cancel the resonance.

The engine may be a gas turbine engine, for example an aero or marine engine. The shaft may be any shaft of such an engine, but particularly a low or intermediate pressure shaft.

Conveniently, the device for measuring the rotational velocity of the shaft may comprise: a phonic wheel which is mounted coaxially to the shaft for rotation therewith, the phonic wheel having a circumferential row of detectable features; and a sensor configured to detect the passage of the row of detectable features by generating an alternating measurement signal having a frequency which is a multiple of the rotational frequency of the shaft.

The measurement of the rotational velocity should be performed at a frequency which is higher than the torsional resonance frequency of the shaft. For example, it can be performed at at least twice the torsional resonance frequency of the shaft, and preferably at at least ten times the torsional resonance frequency of the shaft. The extraction of the oscillatory term from the measured rotational velocity can then include filtering the measured rotational velocity within a frequency range including the torsional resonance frequency.

Conveniently, the command issued by the control unit may be to modulate a flow rate of fuel to the engine to apply the counteracting torque component to the shaft. In this case, the system may further include an engine fuel control system which receives and implements the command. For example, the engine fuel control system may generate a fuel flow demand signal for the engine in response to an acceleration demand signal and a steady state fuel flow requirement. The command can then be implemented in the engine fuel control system by frequency modulating the fuel flow demand signal.

However, another option is for the system to further include an electric motor operatively connected to the shaft to apply a torque thereto, the electric motor receiving and implementing the command. The electric motor can be a starter motor or a generator.

The system can be configured for simultaneously reducing torsional resonance of plural rotating shaft of the engine, e.g. by including plural respective devices for simultaneously measuring the rotational velocities of the shafts; and including one more control units for extracting respective oscillatory terms and issuing respective commands.

According to a third aspect there is provided a gas turbine engine having the system for reducing torsional resonance according to the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above).

Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17.

The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
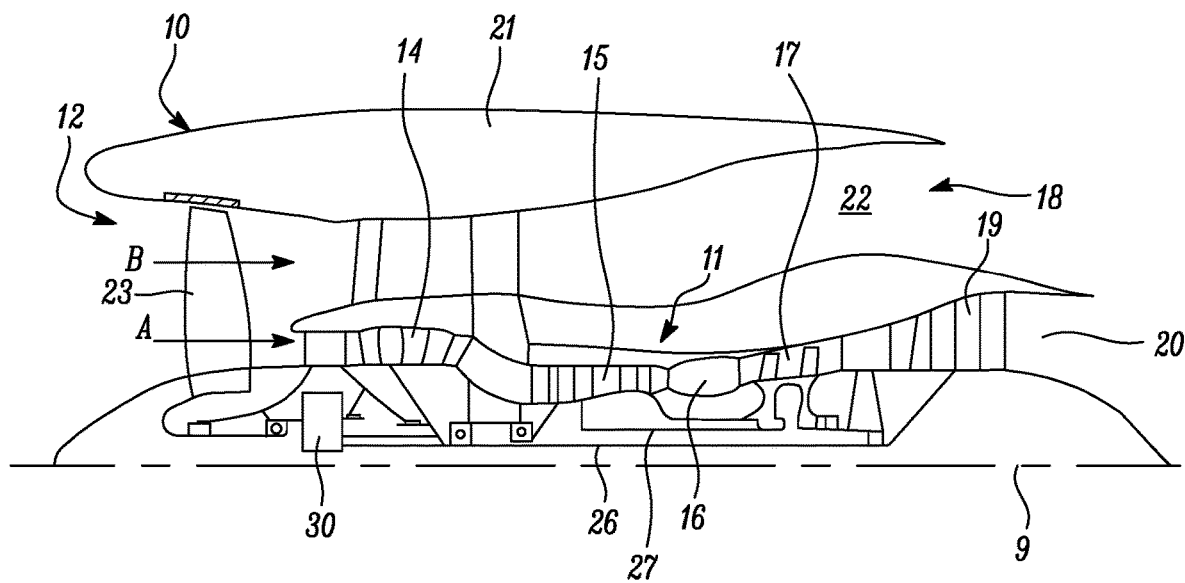
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
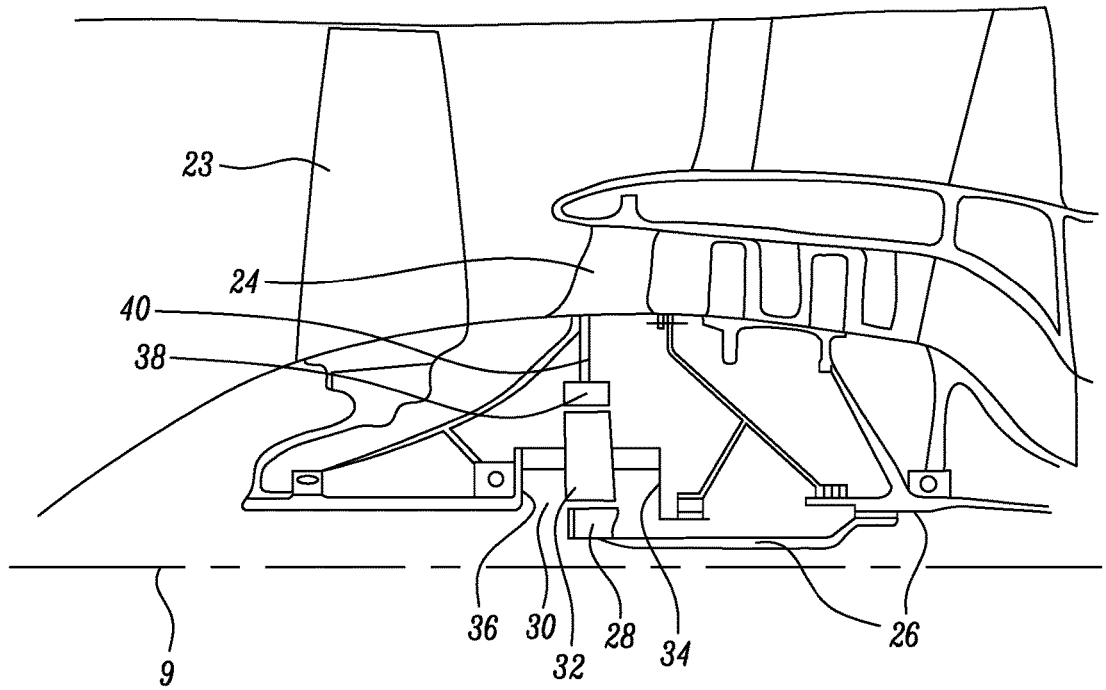
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
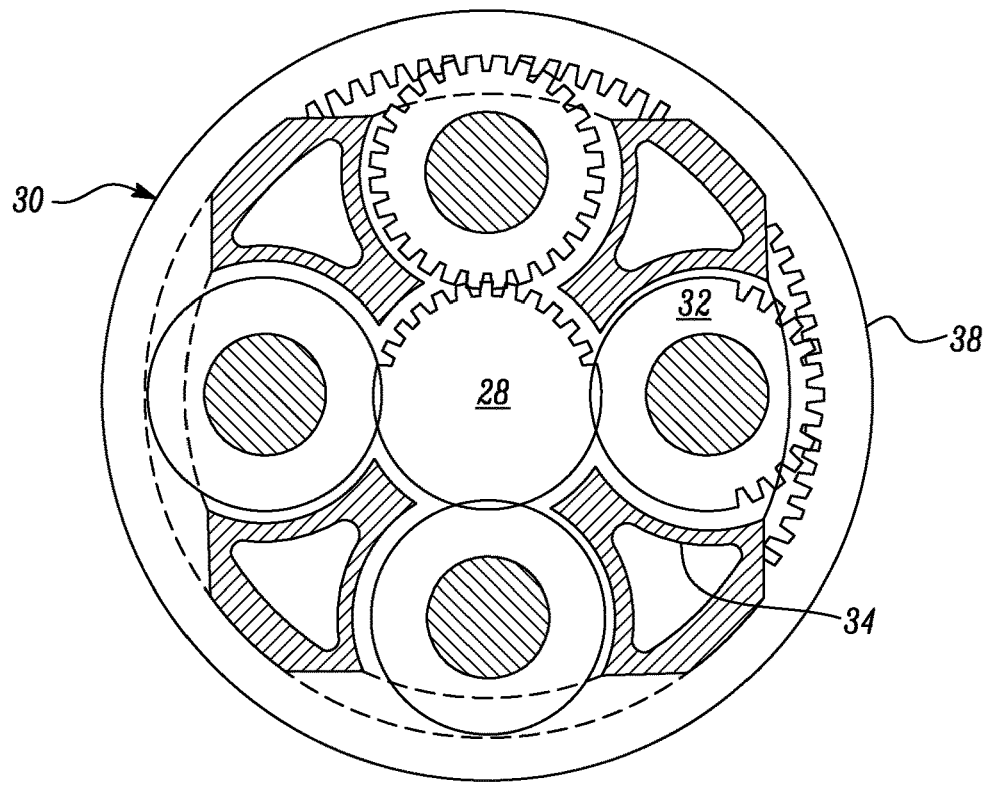
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

It is known to control the thrust of a gas turbine engine using a control system implemented by an Electronic Engine Controller (EEC), the thrust of the engine being indirectly measured using shaft speed, Engine Pressure Ratio (EPR) or Turbine Power Ratio (TPR). The EEC also controls (i) the shaft speeds within safe operational limits, and (ii) the temperature and pressure at different parts of the engine to avoid undesirable conditions such as surge or stall, and to ensure the integrity of the engine. Environmental considerations as well as growing power demands of modern aircraft require control systems that are robust and optimised to the operating conditions of the aircraft. In particular, electronic closed-loop fuel control systems have an integrating action which helps to ensure accurate control of the engine while meeting the pilot's demands for thrust and complying with safety limits.

For example, the engine 10 may have an engine fuel control system based on the Rolls-Royce Inverse Model, or RIMM, discussed in U.S. Pat. No. 8,321,104 (incorporated herein by reference). The control system, shown schematically in FIG. 4, relates the rotational speed of the high-pressure shaft NH to the fuel flow requirement $W_f$. In more detail, it subtracts at summer junction 41 an estimate of the steady state fuel flow requirement $W_f^{ss}$ from a feedback of the trimmed aggregate fuel flow demand signal $W_{fd}$. The difference is multiplied at 42 by an estimated rate of change of engine speed with fuel increment NHdot/$\Delta W_f$ to provide an estimate of engine acceleration NHdot, and this is then integrated at block 43 to provide an estimate for NH. The dynamics of the RRIM are tuned to the requirements of the engine via data within nonlinear modules of first 44 and second 45 engine model blocks or modules embedded within the feedback loop to respectively produce $W_f^{ss}$ and $\Delta W_f$/NHdot values from the estimate for NH, $W_f^{ss}$ being a steady state fuel flow requirement, and $\Delta W_f$ being an over-fuelling requirement. The system accounts for, e.g. the pilot's engine speed demand lever and an acceleration limiter loop comparator, to generate an acceleration demand signal $NH_d$dot which is combined at multiplier 46 with the $\Delta W_f$/NHdot value to provide an overfuelling requirement $\Delta W_f$ sent to a summer junction 47 for combining with the $W_f^{ss}$ value to generate a minimum fuel flow requirement $W_f$. This is then supplied to a logic block 48 for comparison with fuel schedules/limiting loops (providing e.g. a maximum fuel flow signal) to produce the trimmed aggregate fuel flow demand signal $W_{fd}$ for controlling the operation of a fuel system which in turn regulates the flow of fuel to the engine.

Advantageously, such a system can be modified to provide active damping of either of the shafts 26, 27 of the engine. In particular, the feedback loop of the engine fuel control system typically runs at about 25 ms and caters for first order dynamics governed by turbine torque driving a total spool inertia. However, a representative model of higher order dynamics that includes shaft resonance can be represented by a second order transfer function such as:

$$H(s) = \frac{\theta}{\tau} = \frac{A\omega_0^2}{s^2 + 2\zeta\omega_0 s + \omega_0^2}$$

or in differential form as:

$$\frac{d^2\theta}{dt^2} + 2\zeta\omega_0\frac{d\theta}{dt} + \omega_0^2\theta = A\omega_0^2\tau$$

or:

$$\frac{d^2\theta}{dt^2} + 2\zeta\omega_0\omega + \omega_0^2\theta = A\omega_0^2\tau$$

where $\tau$ is the torque on the shaft, $\theta$ is the shaft wind up or twist, $\omega=d\theta/dt$ is the rate of change of twist in the rotating frame of reference of the shaft (i.e. $\omega$ is the torsional oscillation of the shaft), A is a DC gain, $\zeta$ is a damping factor and $\omega_0$ is the undamped resonance frequency.

Figure 4:
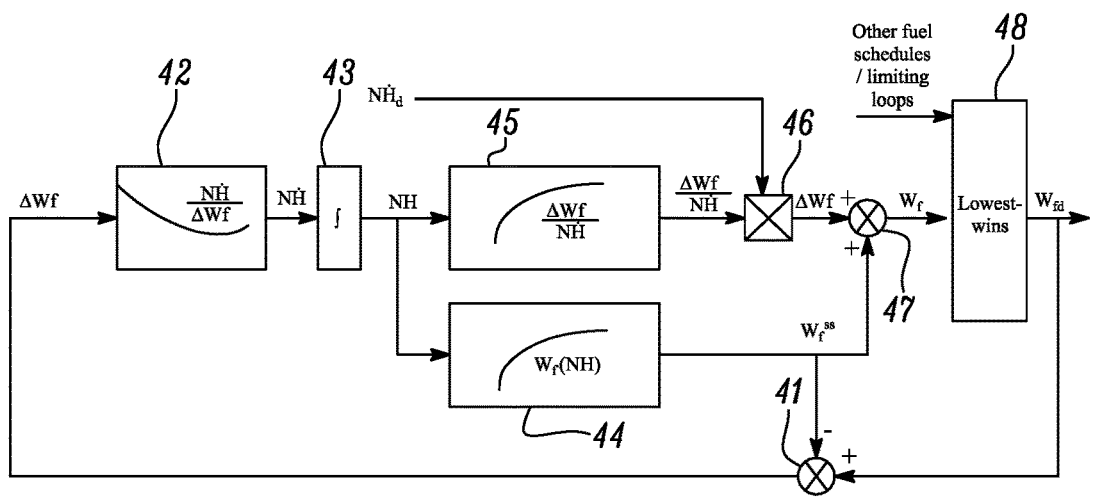
FIG. 4 shows schematically an engine fuel control system.

The trimmed aggregate fuel flow demand signal $W_{fd}$ resulting from the control system of FIG. 4 results in a nominal torque on the shaft, $\tau_{nominal}$. To actively counteract or cancel a torsional resonance, $\tau_{nominal}$ can be supplemented by a torque component applied to the shaft which is modulated at the same frequency as, but in opposition to, the torsional oscillation $\omega$. Thus the overall torque on the shaft $\tau=\tau_{nominal}-\alpha\omega$, where $\alpha$ is a constant of proportionality.

Figure 5:
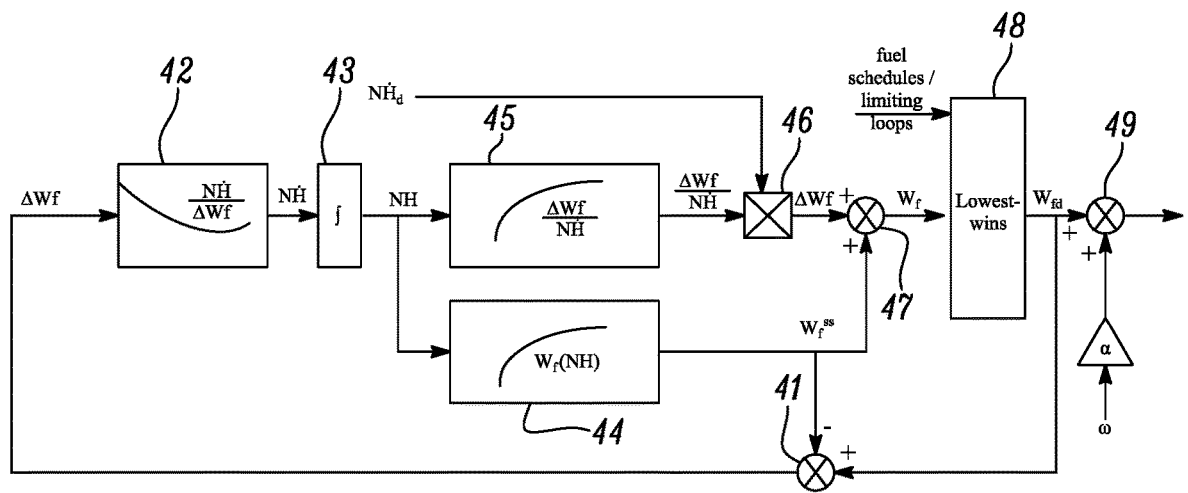
FIG. 5 shows schematically a modified engine fuel control system for active shaft damping.

A modified engine fuel control system that can provide such active damping is shown in FIG. 5. In the modified system, a further summer junction 49 adjusts the aggregate fuel flow demand signal $W_{fd}$ from the logic block 48 by an amount proportional to—$\alpha\omega$. Notably, although the fuel control system uses a measurement of the high-pressure shaft NH to determine $W_{fd}$, the adjusted flow demand signal can be used to actively damp either the high-pressure shaft 27 or the low-pressure shaft 26. Indeed both shafts can be simultaneously actively damped by providing summer junction 49 with a respective–$\alpha\omega$ for each shaft. That the low-pressure shaft 26 can be damped in this way, despite the intervention of the high-pressure turbine 17 between the combustion equipment 16 and the low pressure turbine 19, is possible because the gas dynamics in the turbine end of the engine operate over substantially shorter time scales than the shaft dynamics. Moreover, there is little chance that a fuel flow demand signal modulation use to actively damp one shaft will cause resonance of another shaft because the shaft resonance frequencies are generally well separated.

To perform the frequency modulation of $W_{fd}$ in proportion to—$\alpha\omega$ requires measurements of the torsional oscillation $\omega$ to be available to the engine fuel control system at a significantly higher rate than the 25 ms run time of the control system feedback loop. A suitable measurement rate of about 5 ms can be achieved using a phonic wheel on the shaft of interest. Any such phonic wheel would typically be mounted towards the front end of a shaft, i.e. adjacent its compressor, and at a distance from the midpoint of the shaft about which torsional oscillations are usually centred. This places the phonic wheel at a location where the torsional oscillations are of relatively high amplitude, and hence increases the sensitivity of measurements made using the wheel.

Figure 6:
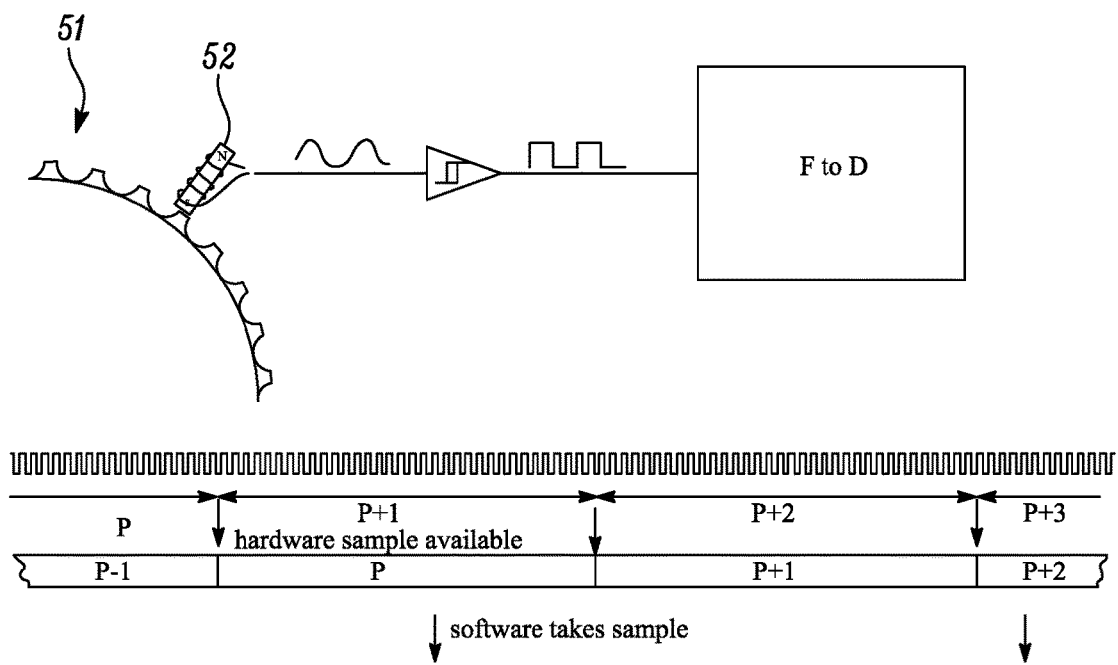
FIG. 6 shows schematically at top a phonic wheel and sensor, and at bottom an alternating measurement signal generated by the sensor and software data averaging of the signal.

Conventionally, phonic wheels and associated sensors are used to measure shaft speed. For example, FIG. 6 shows schematically at top a phonic wheel 51 which is mounted coaxially to the shaft for rotation therewith. The phonic wheel has a circumferential row of teeth, and a variable reluctance sensor 52 which detects the passage of the row of teeth by generating an alternating measurement signal. As each tooth of the phonic wheels passes close to the front face of a pole piece of the sensor there is a change in the magnetic flux experienced by a conductive wire wrapped around the pole piece, owing to the change in the reluctance of the magnetic circuit consisting of the pole piece, the phonic wheel and the air gap between the two.

For shaft speed measurement, software determines rolling averages (based on e.g. 10 to 20 samples) of the timing pulses (tooth passing events) of the measurement signal and these averages are used to continuously calculate and update the rotational speed. In particular, the software typically includes a zero crossing detector that samples using a clock rate of a few MHz to determine the timing between zero crossings. This is then used to calculate the rotational speed of the phonic wheel 51. However, the software can also sample the sinusoidal waveform produced by the phonic wheel directly using a fast ND converter, at a suitable frequency (e.g. 20 kHz to 20 MHz).

Using any of various frequency demodulation techniques known to the persons skilled in the art (e.g. using a Hilbert transform), it is then possible to recover the harmonic content associated with the phonic wheel vibration due to the torsional oscillation $\omega$ of the shaft.

The true shaft speed signal generated by the phonic wheel sensor 52 when the shaft is oscillating is given by:

$$N=A\ \sin(\Omega t+B\ \sin(\omega_0 t))$$

where $\Omega$ is the shaft rotational velocity. This is a frequency modulated signal and can therefore be de-modulated using phase-locked loops, quadrature detection and techniques known to people skilled in the art. This can be implemented in the EEC by deploying field-programmable gate arrays or digital signal processors, to recover the signal $\omega=B\ \sin(\omega_0 t)$) in order to use in the engine fuel control system.

Instead of a phonic wheel, the torsional oscillation $\omega$ can be measured using e.g. an optical encoder. Such a device can provide an improved signal to noise ratio relative to a phonic wheel.

The active damping approach discussed above does not rely on designing out all possible interactions that may give rise to shaft resonance. It is thus more adaptable. It is also enabling of reduced shaft responses, thereby increasing shaft life.

Although described above in respect of an aero gas turbine engine, the approach can be used e.g. for active damping of a shaft of a marine engine coupled to a propeller, or for active damping of a power-offtake shaft of an engine being used for electrical power generation.

Figure 7:
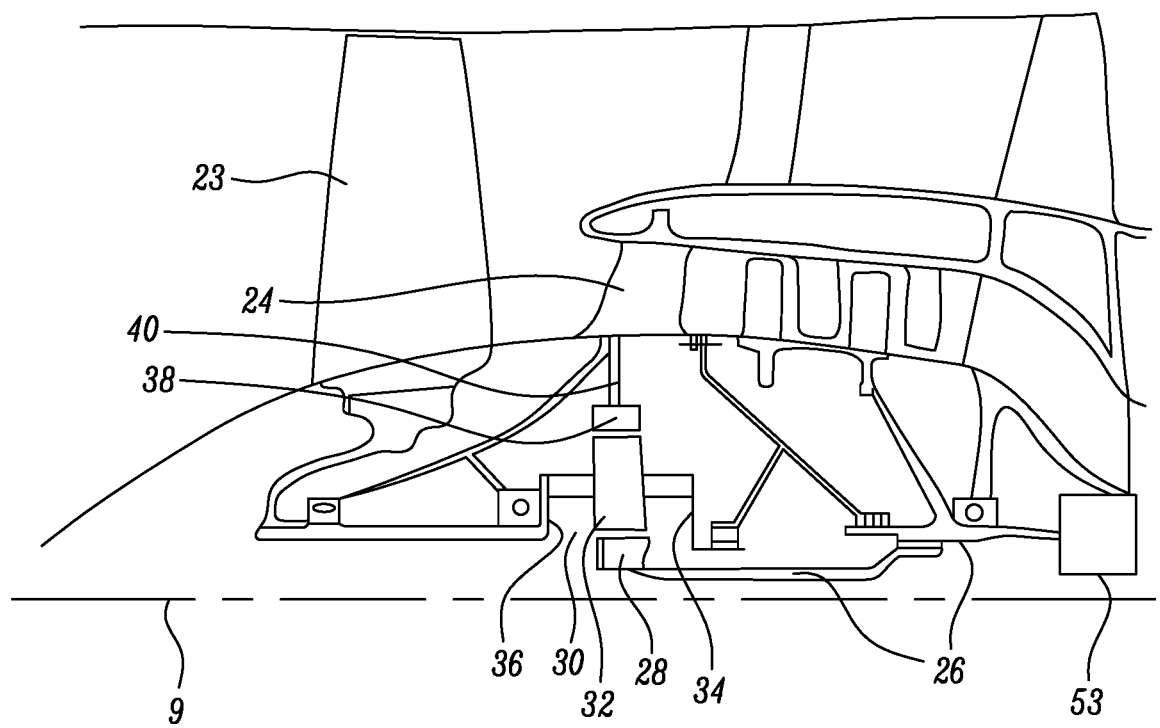
FIG. 7 shows a similar view to FIG. 2, but of an alternative gas turbine engine.

The active damping can be applied to the shaft by means other than modulating the fuel supply. For example, the engine may have an electric motor 53, such as a starter motor or generator such as that shown in FIG. 7, which can be used to apply the torque component—$\alpha\omega$ directly to the shaft.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of actively controlling torsional resonance of a rotating shaft of an engine, the shaft having a rotational velocity characterised by (i) a low frequency, rotational velocity term and (ii) a high frequency, oscillatory term superimposed on the low frequency term, the oscillatory term being caused by torsional resonance, the method comprising:

measuring the rotational velocity of the shaft;

extracting the oscillatory term from the measured rotational velocity; and applying a torque component to the shaft based on the extracted oscillatory term, the torque component being modulated at a same frequency as the torsional resonance to counteract the torsional resonance, the torque component being applied by modulating a flow rate of fuel to the engine, which includes an engine fuel control system that generates a fuel flow demand signal in response to an acceleration demand signal and a steady state fuel flow requirement, the flow rate of fuel to the engine being modulated by frequency modulating the fuel flow demand signal to generate the torque component at the same frequency as the torsional resonance.

2. The method according to claim 1, wherein:
the measurement of the rotational velocity is performed at a frequency that is higher than the torsional resonance frequency of the shaft.

3. The method according to claim 1, wherein the extraction of the oscillatory term from the measured rotational velocity includes demodulating the measured rotational velocity.

4. A system for reducing torsional resonance of a rotating shaft of an engine, the shaft having a rotational velocity characterised by (i) a low frequency, rotational velocity term and (ii) a high frequency, oscillatory term superimposed on the low frequency term, the oscillatory term being caused by torsional resonance, the system comprising:

a device configured to measure the rotational velocity of the shaft; and a control unit configured to perform:

extracting the oscillatory term from the measured rotational velocity; and generating and issuing a command to apply a torque component to the shaft based on the extracted oscillatory term, the torque component being modulated at a same frequency as the torsional resonance to counteract the torsional resonance, the torque component being applied by modulating a flow rate of fuel to the engine, which includes an engine fuel control system that generates a fuel flow demand signal in response to an acceleration demand signal and a steady state fuel flow requirement, the flow rate of fuel to the engine being modulated by frequency modulating the fuel flow demand signal to generate the torque component at the same frequency as the torsional resonance.

5. The system according to claim 4, wherein the device for measuring the rotational velocity of the shaft includes:

a phonic wheel that is mounted coaxially to the shaft for rotation therewith, the phonic wheel having a circumferential row of detectable features; and a sensor configured to detect a passage of the row of detectable features by generating an alternating measurement signal having a frequency that is a multiple of the rotational frequency of the shaft.

6. The system according to claim 4, wherein:
the measurement of the rotational velocity by the device is performed at a frequency which is higher than the torsional resonance frequency of the shaft; and
the extraction of the oscillatory term from the measured rotational velocity by the control unit includes filtering the measured rotational velocity within a frequency range including the torsional resonance frequency.

7. A gas turbine engine having the system for reducing torsional resonance according to claim 4.

* * * * *